(12) United States Patent
Chen et al.

(10) Patent No.: US 8,253,698 B2
(45) Date of Patent: Aug. 28, 2012

(54) TACTILE TOUCH SCREEN FOR ELECTRONIC DEVICE

(75) Inventors: Chao Chen, Waterloo (CA); Jason Griffin, Kitchener (CA); Norman Ladouceur, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1178 days.

(21) Appl. No.: 11/944,533

(22) Filed: Nov. 23, 2007

(65) Prior Publication Data

US 2009/0135145 A1 May 28, 2009

(51) Int. Cl.
*G06F 3/041* (2006.01)
(52) U.S. Cl. ...................................... 345/173
(58) Field of Classification Search .......... 345/173–178; 178/18.01–18.11
See application file for complete search history.

(56) References Cited

U.S. PATENT DOCUMENTS

| | | | |
|---|---|---|---|
| 5,977,867 A | 11/1999 | Blouin | |
| 6,429,846 B2 * | 8/2002 | Rosenberg et al. | ........... 345/156 |
| 6,724,370 B2 | 4/2004 | Dutta et al. | |
| 2002/0173344 A1 | 11/2002 | Cupps et al. | |
| 2004/0108995 A1 | 6/2004 | Hoshino et al. | |
| 2006/0109254 A1 | 5/2006 | Akieda et al. | |
| 2006/0119586 A1 | 6/2006 | Grant et al. | |
| 2006/0181517 A1 | 8/2006 | Zadesky et al. | |
| 2006/0197753 A1 | 9/2006 | Hotelling | |
| 2007/0247429 A1 | 10/2007 | Westerman | |
| 2009/0128501 A1 * | 5/2009 | Lazaridis et al. | ............. 345/173 |

FOREIGN PATENT DOCUMENTS

| | | |
|---|---|---|
| DE | 20102197 | 6/2001 |
| EP | 0419145 A1 | 3/1991 |
| EP | 1450247 | 8/2004 |
| EP | 1691263 A1 | 8/2006 |
| GB | 2402105 A | 12/2004 |
| JP | 2005-092472 A | 4/2005 |
| JP | 2006-134243 A | 5/2006 |
| JP | 2008-532115 A | 8/2008 |
| WO | 2004107146 A2 | 12/2004 |

OTHER PUBLICATIONS

European Application No. 07121465.4 Search Report dated Apr. 10, 2008.
Examination Report, European Patent Application No. 07121465.4 dated Jun. 25, 2008.
Japanese Office Action dated May 16, 2011, issued in respect of corresponding Japanese Patent Application No. 2008-280561.

* cited by examiner

*Primary Examiner* — Jimmy H Nguyen
(74) *Attorney, Agent, or Firm* — Geoffrey deKleine; Borden Ladner Gervais LLP (57) ABSTRACT

An electronic device includes a base and a touch screen display connected to the base and movable relative thereto. The touch screen display includes a display device and a touch-sensitive input surface overlying the display device. The electronic device includes a feedback mechanism including a switch moveable relative to the base for actuating in response to application of a force to the touch-sensitive input surface causing movement of the touch screen display. Operational components are connected to the touch screen display for operation of the electronic device.

23 Claims, 9 Drawing Sheets

TACTILE TOUCH SCREEN FOR ELECTRONIC DEVICE

FIELD OF TECHNOLOGY

The present application relates to touch screen devices and arrangements for providing tactile response for such touch screen devices.

BACKGROUND

Portable electronic devices have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs or smart telephones are generally intended for handheld use and easy portability. Smaller devices are generally desirable for portability. A touch screen input/output device is particularly useful on such handheld devices as such handheld devices are small and are therefore limited in space available for user input and output devices. Further, the screen content on the touch screen input/output devices can be modified depending on the functions and operations being performed.

Touch screen input/output devices are constructed of a display, such as a liquid crystal display, with a touch-sensitive overlay. These input/output devices suffer from inherent disadvantages relating to user interaction and response, however. In particular, such touch screen input/output devices fail to provide a user-desirable tactile feedback for positively indicating input, providing a poor user-experience.

Improvements in input/output devices are therefore desirable.

BRIEF DESCRIPTION OF THE DRAWINGS

Embodiments of the present application will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. It will be understood that the exemplary views, particularly those shown in FIGS. 2 and 4 to 13 are not scale and are provided for the purpose of explanation and understanding.

The embodiments described herein generally relate to a portable electronic device having a display. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Figure 1:
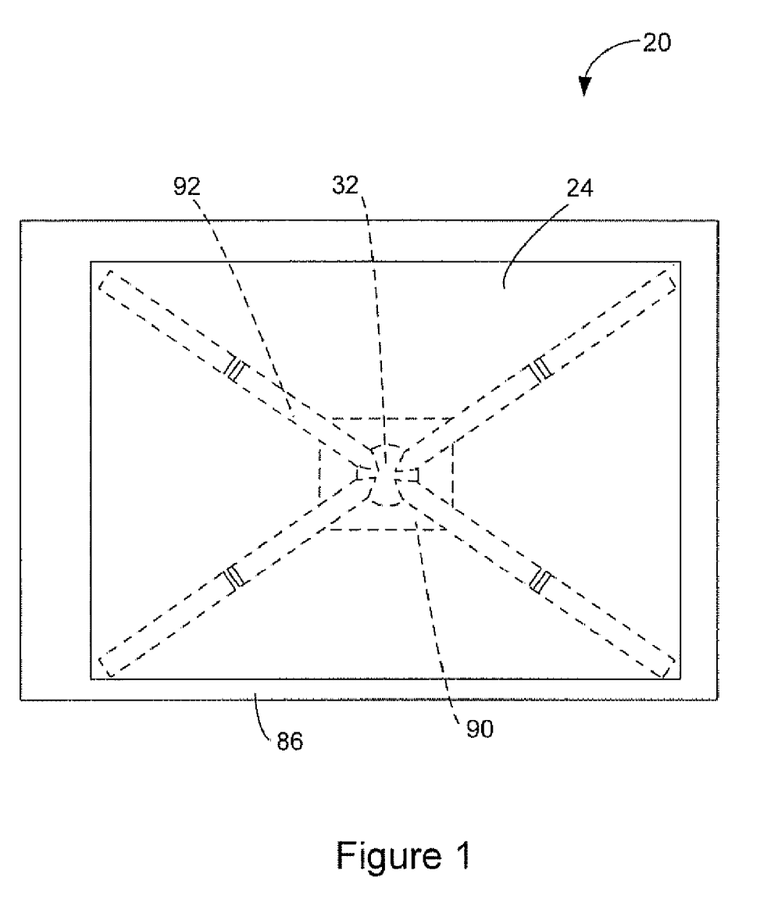
FIG. 1 is a top view of a portable electronic device according to one exemplary embodiment, with certain hidden features shown in ghost outline for the purpose of illustration.
Figure 2:
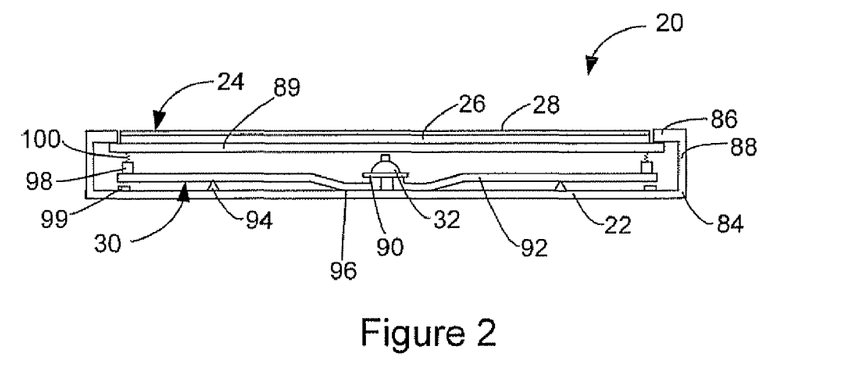
FIG. 2 is a simplified sectional side view of the portable electronic device of FIG. 1 (not to scale)
Figure 3:
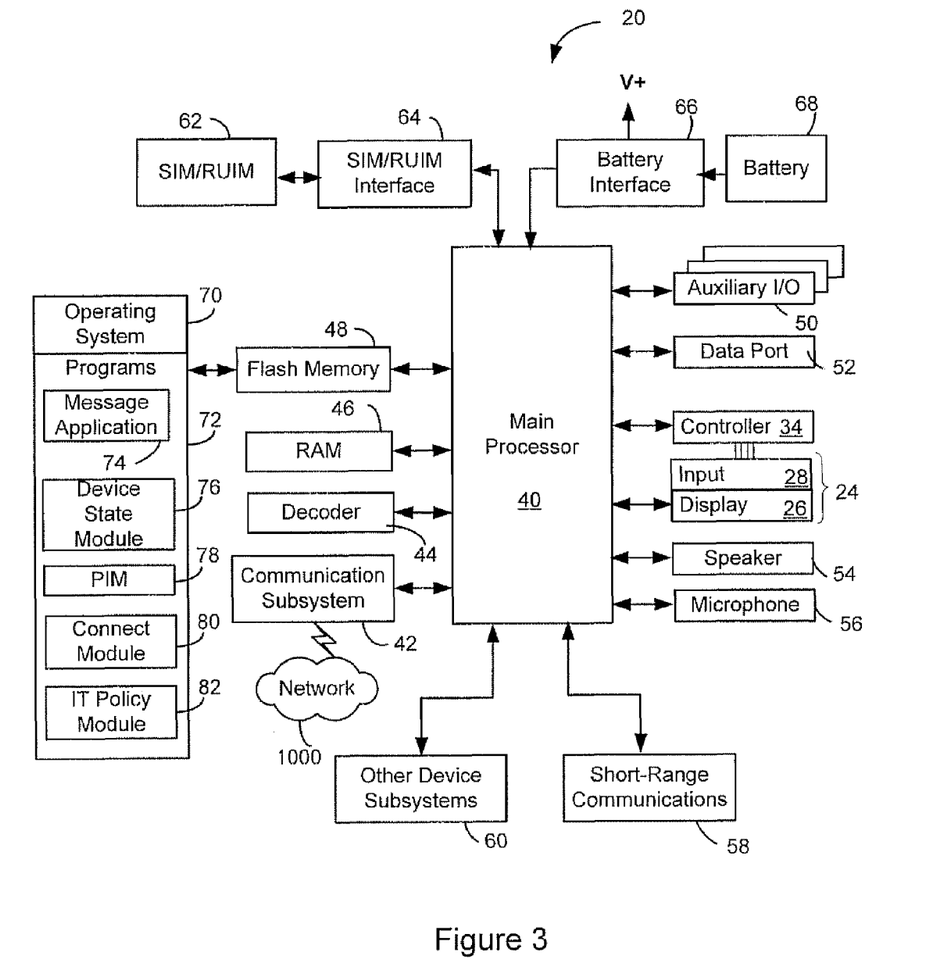
FIG. 3 is a block diagram of certain components, including certain internal components, of the portable electronic device of FIG. 1.

Referring to FIGS. 1 to 3, an electronic device, which in the present embodiment is a portable electronic device, is indicated generally by the numeral 20. The electronic device 20 includes a base 22 and a touch screen display 24 connected to the base 22 and movable relative thereto. The touch screen display 24 includes a display device 26 and a touch-sensitive input surface 28 overlying the display device 26. The electronic device 20 includes a feedback mechanism 26 including a switch 28 moveable relative to the base 22 for actuating in response to application of a force to the touch-sensitive input surface 28 causing movement of the touch screen display 24. Operational components are disposed between the touch screen display 24 and the base 22 for operation of the electronic device 20. The touch-sensitive input surface 28 is connected to a processor 40 of the portable electronic device 20 via a controller 34.

Referring now to FIG. 3, there is shown therein a block diagram of an exemplary embodiment of a portable electronic device 20. The portable electronic device 20 includes a number of components such as the processor 40 that controls the overall operation of the portable electronic device 20. Communication functions, including data and voice communications, are performed through a communication subsystem 42. Data received by the portable electronic device 20 can be decompressed and decrypted by decoder 44, operating according to any suitable decompression techniques (e.g. YK decompression, and other known techniques) and encryption techniques (e.g. using an encryption techniques such as Data Encryption Standard (DES), Triple DES, or Advanced Encryption Standard (AES)). The communication subsystem 42 receives messages from and sends messages to a wireless network 1000. In this exemplary embodiment of the portable electronic device 20, the communication subsystem 42 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 42 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 40 also interacts with additional subsystems such as a Random Access Memory (RAM) 46, a flash memory 48, the display device 26 with the input surface 28, an auxiliary input/output (I/O) subsystem 50, a data port 52, a speaker 54, a microphone 56, short-range communications 58 and other device subsystems 60.

Some of the subsystems of the portable electronic device 20 perform communication-related functions, whereas other subsystems may provide "resident" or on-device functions. By way of example, the display 28 and the input surface may be used for both communication-related functions, such as entering a text message for transmission over the network 1000, and device-resident functions such as a calculator or task list.

The portable electronic device 20 can send and receive communication signals over the wireless network 1000 after network registration or actuation procedures have been completed. Network access is associated with a subscriber or user of the portable electronic device 20. To identify a subscriber according to the present embodiment, the portable electronic device 20 uses a SIM/RUIM card 62 (i.e. Subscriber Identity Module or a Removable User Identity Module) to be inserted into a SIM/RUIM interface 64 in order to communicate with a network. The SIM/RUIM card 62 is one type of a conventional "smart card" that can be used to identify a subscriber of the portable electronic device 20 and to personalize the portable electronic device 20, among other things. In the present embodiment the portable electronic device 20 is not fully operational for communication with the wireless network 1000 without the SIM/RUIM card 62. By inserting the SIM/RUIM card 62 into the SIM/RUIM interface 64, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 62 includes a processor and memory for storing information. Once the SIM/RUIM card 62 is inserted into the SIM/RUIM interface 64, it is coupled to the processor 40. In order to identify the subscriber, the SIM/RUIM card 62 can include some user parameters such as an International Mobile Subscriber Identity (IMSI). An advantage of using the SIM/RUIM card 62 is that a subscriber is not necessarily bound by any single physical portable electronic device. The SIM/RUIM card 62 may store additional subscriber information for a portable electronic device as well, including datebook (or calendar) information and recent call information. Alternatively, user identification information can also be programmed into the flash memory 48.

The portable electronic device 20 is a battery-powered device and includes a battery interface 66 for receiving one or more rechargeable batteries 68. In at least some embodiments, the battery 68 can be a smart battery with an embedded microprocessor. The battery interface 66 is coupled to a regulator (not shown), which assists the battery 68 in providing power V+ to the portable electronic device 20. Although current technology makes use of a battery, future technologies such as micro fuel cells may provide the power to the portable electronic device 20.

The portable electronic device 20 also includes an operating system 70 and software components 72 to 82 which are described in more detail below. The operating system 70 and the software components 72 to 82 that are executed by the processor 40 are typically stored in a persistent store such as the flash memory 48, which may alternatively be a read-only memory (ROM) or similar storage element (not shown). Those skilled in the art will appreciate that portions of the operating system 70 and the software components 72 to 82, such as specific device applications, or parts thereof, may be temporarily loaded into a volatile store such as the RAM 46.

Other software components can also be included, as is well known to those skilled in the art.

The subset of software applications 72 that control basic device operations, including data and voice communication applications, will normally be installed on the portable electronic device 20 during its manufacture. Other software applications include a message application 74 that can be any suitable software program that allows a user of the portable electronic device 20 to send and receive electronic messages. Various alternatives exist for the message application 74 as is well known to those skilled in the art. Messages that have been sent or received by the user are typically stored in the flash memory 48 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 76, a Personal Information Manager (PIM) 78, and other suitable modules (not shown). The device state module 76 provides persistence, i.e. the device state module 76 ensures that important device data is stored in persistent memory, such as the flash memory 48, so that the data is not lost when the portable electronic device 20 is turned off or loses power.

The PIM 78 includes functionality for organizing and managing data items of interest to the user, such as, but not limited to, e-mail, contacts, calendar events, voice mails, appointments, and task items. A PIM application has the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The portable electronic device 20 also includes a connect module 80, and an information technology (IT) policy module 82. The connect module 80 implements the communication protocols that are required for the portable electronic device 20 to communicate with the wireless infrastructure and any host system, such as an enterprise system, that the portable electronic device 20 is authorized to interface with.

The connect module 80 includes a set of APIs that can be integrated with the portable electronic device 20 to allow the portable electronic device 20 to use any number of services associated with the enterprise system. The connect module 80 allows the portable electronic device 20 to establish an end-to-end secure, authenticated communication pipe with the host system. A subset of applications for which access is provided by the connect module 80 can be used to pass IT policy commands from the host system to the portable electronic device 20. This can be done in a wireless or wired manner. These instructions can then be passed to the IT policy module 82 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 1000, the auxiliary I/O subsystem 50, the data port 52, the short-range communications subsystem 58, or any other suitable device subsystem 60. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 52 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 52 can be any suitable port that enables data communication between the portable electronic device 20 and another computing device. The data port 52 can be a serial or a parallel port. In some instances, the data port 52 can be a USB port that includes data lines for data transfer and a supply line that can provide a charging current to charge the battery 68 of the portable electronic device 20.

The short-range communications subsystem 58 provides for communication between the portable electronic device 20 and different systems or devices, without the use of the wireless network 1000. For example, the subsystem 58 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 42 and input to the processor 40. The processor 40 then processes the received signal for output to the display 26 or alternatively to the auxiliary I/O subsystem 50. A subscriber may also compose data items, such as e-mail messages, for example, using the input surface 28 in conjunction with the controller 34, the display 26 and possibly the auxiliary I/O subsystem 50. It will be appreciated that the location of a touch on the touch-sensitive input surface 28 communicates with the main processor 40 via the controller 34 for determining the location of a touch on the touch screen display 34. The auxiliary subsystem 50 may include devices such as: a mouse, track ball, infrared fingerprint detector, or a roller wheel with dynamic button pressing capability. A keyboard can also be provided, such as an alphanumeric keyboard and/or telephone-type keypad. A composed item may be transmitted over the wireless network 1000 through the communication subsystem 42.

For voice communications, the overall operation of the portable electronic device 20 is substantially similar, except that the received signals are output to the speaker 54, and signals for transmission are generated by the microphone 56. Alternative voice or audio I/O subsystems, such as a voice message recording subsystem, can also be implemented on the portable electronic device 20. Although voice or audio signal output is accomplished primarily through the speaker 54, the display device 26 can also be used to provide additional information such as the identity of a calling party, duration of a voice call, or other voice call related information.

Referring again to FIGS. 1 and 2, the base 22 is part of a housing 84 that also includes a frame 86 spaced from the base 22 and framing the touch screen display 24. Sidewalls 88 extend between the base 22 and the frame 86. According to the present exemplary embodiment, the sidewalls 88 extend generally perpendicular to the base 22 and the frame 86. The base 22 includes a plate (not shown) that is releasably attached for insertion and removal of, for example, the battery 68 and the SIM/RUIM card 62 described above. It will be appreciated that the base 22, the sidewalls 88 and the frame 86 can be injection molded, for example. The frame 86 is sized and shaped to frame a window in which the touch screen display 24 is exposed for input by user contact with the input surface 28 of the touch screen display 24 and for displaying output on the display device 26. The touch screen display 24 is biased towards the frame 86, as shown in FIG. 2 and the frame 86 maintains the touch screen display 24 within the housing 84. Thus, the touch screen display 24 is moveable within and constrained by the housing 84. It is contemplated that the edges of the touch screen display 24 can be supported by an edge support that surrounds the edges. According to the embodiment shown in FIG. 1, the frame 86 is generally rectangular although other shapes are possible. For example, the corners of the frame 86 can be rounded.

The touch screen display 24 is supported by a rigid display support 89 to provide structural support to the touch screen display 24 and inhibit bending causing damage or breaking of the touch screen display 24. The display support 89 can be formed of any suitable material and can include further functional components such as a printed circuit board. It will be appreciated that the touch screen display 24 is an assembly of components including, the touch-sensitive input surface 28, also referred to herein as the input surface 28, overlying the LCD display device 26 and other components including optional components such as a backlight (not shown).

As indicated above, the portable electronic device 20 includes the feedback mechanism 30 which includes the switch 32 as well as other components for providing tactile feedback to the user of the portable electronic device 20 when applying a force by user-pressing on the input surface 28 of the touch screen display 24. According to the present embodiment, the switch 32 is a mechanical dome-type switch 32 and is shown in FIG. 2 in the uncompressed or non-actuated state, however, the switch 32 can be any suitable mechanical switch. The switch 32 is disposed on a switch platform 90 that is moveable away from the base 22, in the direction of the touch screen display 24. Thus, the switch 32 is also moveable, with the switch platform 90, toward the touch screen display 24. Each of four lever arms 92 extend from an underside of the switch platform 90 on which the switch 32 is disposed, toward respective corners of the touch screen display 24. Each of the lever arms 92 is pivotable about a respective fulcrum provided by a respective pivot 94 having a triangular cross-section and disposed between the base 22 and the respective lever arm 92, as shown in FIG. 2. Thus, each pivot 94 contacts one side of a respective lever arm 92 between opposing ends thereof. The lever arms 92 are each shaped to provide a rest surface 96 proximal the switch platform for resting against the base 22 when no force is applied to the touch screen display 24 and a projection 98 is provided for abutting against the display support 89 when the touch screen display 24 is displaced in the direction of the base 22. Stops 99 extend from the base 22, near the end of the lever arms 92, for limiting displacement of the lever arms 92 and the touch screen display 24 toward the base 22. The stops 99 are not limited to the square shaped stops shown in the figures and can take any suitable form. The pivot 94 is located between the rest surface 96 and the projection 98 for pivoting between the rest position, as shown in FIG. 2 and a pivoted position, as best shown by the lever arm 92 at the right-hand side of FIG. 3. A respective biasing element 100 extends between and is connected to the display support 89 and the projection 98 for biasing the touch screen display 24 toward the frame 86.

It will now be appreciated that each lever arm 92 is pivotable about the fulcrum provided by the respective pivot 94 to cause movement of the switch platform 90 and the switch 32 between the base 22 and the touch screen display 24. It will also be appreciated that the position of each pivot 94 along the length of the respective lever arm 92 is selected for optimizing performance for moving the switch 32 away from the base 22, toward the touch screen display 24. Thus, displacement of the touch screen display 24, by a force applied by a user pressing on the touch screen display, causes the touch screen display 24 to contact the projections 98. Application of a force near a corner of the touch screen display 24 by a user pressing on the touch-sensitive input surface 28, proximal one of the corners, causes pivoting of the touch screen display 24 such that the corner to which the force is applied, moves toward and abuts the respective projection 98 causing pivoting of the respective lever arm 92. Pivoting of the lever arm 92 results in displacement of the switch platform 90 and the switch 32 away from the base 22, toward the touch screen display 24 to actuate the switch 32 as a result of compression against the display support 89. The extent of displacement of the touch screen display 24 in the direction of the base 22 is limited by the stops 99. Application of a force near a center of the touch screen display 24 by a user pressing on the touch-sensitive input surface 28, proximal a center thereof, causes displacement of the touch screen display 24 toward the projections 98. According to the present embodiment, when the force is applied directly to the center of the touch screen display 24, the touch screen display 24 is displaced resulting in actuation of the switch 32 without pivoting of the lever arms as the touch screen display 24 is displaced in the direction of the base 22, causing compression of the biasing elements 100, into abutment with the projections 98.

The components including the processor 40 and other components described above with reference to FIG. 3 are housed within the housing 84 to provide the functionality of the portable electronic device 20.

As indicated above, the touch screen display 24 includes the display device 26 and the touch-sensitive input surface 28 overlying the display device 26 for providing a graphical user interface for user-input. The touch screen display 24 generates signals when a user touches the touch screen display 24 or slides a finger along the touch screen display 24, resulting in the initiation of commands at the processor 40. The touch screen display 24 provides a graphical user interface for user interaction. Thus, the display device 26 provides graphical representations that are selectable or manipulatable by user interaction with the touch-sensitive input surface 28 of the touch screen display 24.

The switch 32 can provide further input as actuation of switch 32 by user application of a sufficient force by pressing on the input surface 28 of the touch screen display 24 can generate a further signal input to the processor 40. The further signal can cause the initiation of commands at the processor 40, either alone or resulting from the combination of the signal from the switch 32 with signals from the touch sensitive input surface 28. Thus, commands initiated at the processor 40 can be a result of the signals from the touch sensitive input surface 28 or a result of the combination of the signals from the touch sensitive input surface 28 with a signal from the switch 32 caused by user interaction. User interaction can be, for example, the user touching the touch screen display 24 or the user sliding a finger along the touch screen display 24. Different sliding actions of the finger along the touch screen display 24 can also result in different commands initiated at the processor 40.

It is contemplated that the user of the portable electronic device 20 can cause commands to be initiated at the processor 40 of the device by user interaction with the touch screen display 24 without actuating the switch 32. For example, the user can touch or slide a finger along the touch screen display causing the generation of signals and the initiation of commands without applying sufficient force to displace the touch screen display 24 to cause depression of the switch 32.

Figure 4:
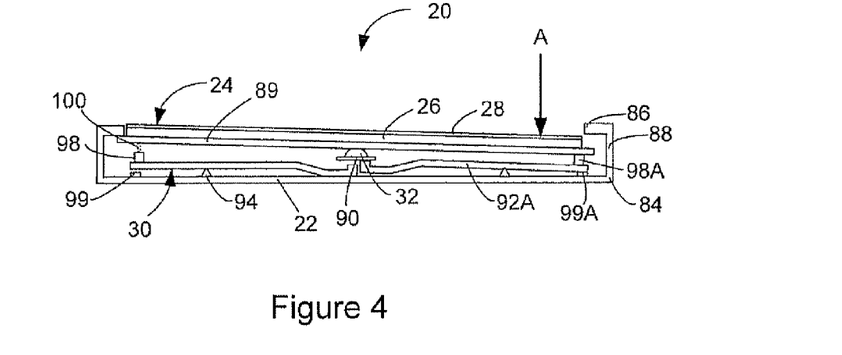
FIG. 4 is a simplified sectional side view of the portable electronic device of FIG. 1 (not to scale), showing a force applied to a point on a touch screen display.
Figure 5:
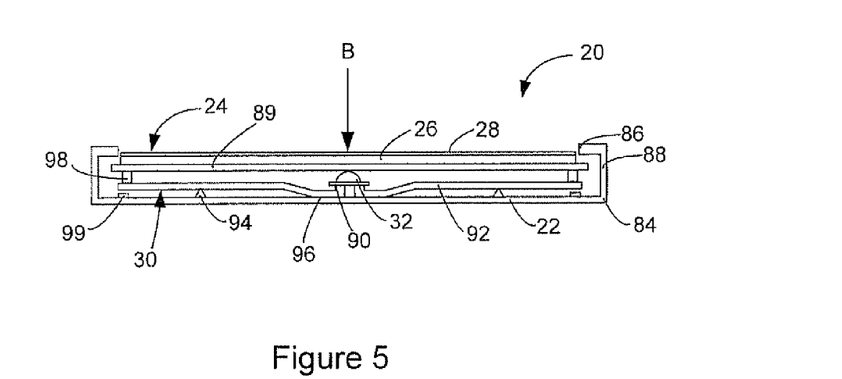
FIG. 5 is a simplified sectional side view of the portable electronic device of FIG. 1 (not to scale), showing a force applied to a point on the touch screen display.

Reference is now made to FIGS. 4 and 5 to describe movement of the touch screen display 24 within the housing 84 of the portable electronic device 20. Referring first to FIG. 4, there is shown a simplified sectional side view of the portable electronic device 20 according to one exemplary embodiment in which a force is applied by, for example, a user pressing a finger on the touch-sensitive input surface 28 of the touch screen display 24, in the direction of the arrow "A". As shown, the user presses on the touch screen display 24 proximal one side of the portable electronic device 20, resulting in pivoting of the touch screen display 24 such that the biasing elements 100 that are on the same side of the portable electronic device 20 at which the force is applied to the touch screen display 24 are compressed. It will be appreciated from the Figure that when a force is applied on the touch screen display 24, the touch screen display 24 pivots against the underside of the frame 86, along an edge on the opposite side of the portable electronic device 20. In the example of FIG. 4, the biasing elements 100 on the right-hand side of the portable electronic device 20 are compressed and the touch screen display 24 abuts the projections 98A and causes pivoting of the lever arms 92A until the lever arms 92A abut the stops 99A.

With the pivoting of the lever arms 92A on the right hand side of the portable electronic device 20, the switch platform 90 and the switch 32 are displaced by the lever arms 92A, causing actuation of the switch 32.

Referring now to the example of FIG. 5 in which a force is applied by, for example, a user pressing a finger on the touch-sensitive input surface 28, approximately at the center of the touch screen display 24, in the direction of the arrow "B". As shown, the user presses on the touch screen display 24, resulting in displacement of the touch screen display 24 toward the base 22 such that all the biasing elements 100 are compressed. It will be appreciated from the Figure that the touch screen display 24 is displaced toward the base 22 while maintaining generally parallel alignment with the base 22. Thus, the touch screen display 24 abuts each of the projections 98 and actuates the switch 32.

In the present example, the force is applied proximal the center of the touch screen display and the resulting displacement of the touch-screen display 24 causes actuation of the switch 32 without pivoting of any of the lever arms 92 and therefore without movement of the switch 32 relative to the base 22 as the touch screen display 24 abuts the projection 98 when the switch is actuated.

Continued reference is made to FIGS. 2, 4 and 5 for the purpose of explanation. In FIG. 2, no force is applied to the input surface 28 of the touch screen display 24 and therefore the touch screen display 24 is in the rest position in which it is biased towards the frame 86. A relative displacement of the touch screen display 24 and the switch 32 of a distance "d" toward each other, results in actuation of the switch 32. In the present embodiment, the touch screen display 24 is displaced a similar distance of "d" proximal any corner of the touch screen display 24 to contact the respective projection 98. Referring now to FIG. 5, the force "B" applied to the center of the touch screen display results in displacement of the touch screen display 24 a distance of "d" at each corner and a similar distance of "d" at the center. Thus, the touch screen display 24 is displaced resulting in actuation of the switch 32 in the absence of pivoting of the lever arms 92. In FIG. 4, however, the force "A" is applied to the touch screen display 24, on one side thereof. Thus, the touch screen display 24 pivots against the underside of the frame 86 on the side opposite to the side at which the force is applied, as described above. In the view shown in FIG. 4, the right side of the touch screen display 24 to which the force is applied is displaced a distance of "d" to contact the projections 98A. The displacement at the left side of the touch screen display 24 is negligible, however. It will be appreciated that the displacement at the center of the touch screen display 24 is approximately ½ "d" when the touch screen display 24 contacts the projections 98 on the right-hand side of the portable electronic device 20. The lever arms 92A permits further displacement of the touch screen display 24 while the switch platform 90 and the switch 32 are moved away from the base 22, until the lever arms 92A contact the stops 99A. Thus, the total relative movement of the switch 32 toward the center of the touch screen display and the center of the touch screen display 24 toward the switch 32 is "d" to actuate the switch 32. It will again be appreciated that the position of the pivots 94 can be selected for suitable performance of the feedback mechanism 30 and the pivots 94 are not required to be centrally located along the respective lever arms 92.

Figure 6:
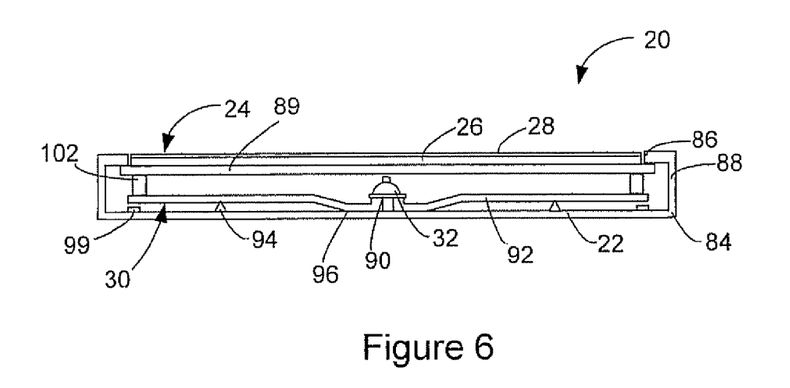
FIG. 6 is a simplified section side view of a portable electronic device according to another embodiment (not to scale)
Figure 7:
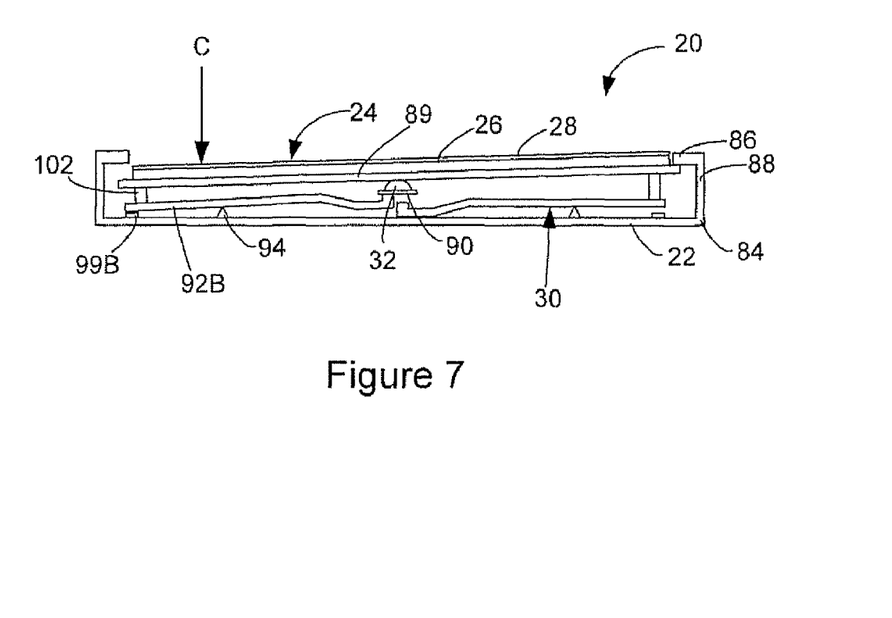
FIG. 7 is a simplified sectional side view of the portable electronic device of FIG. 6 (not to scale), showing a force applied to a point on the touch screen display.
Figure 8:
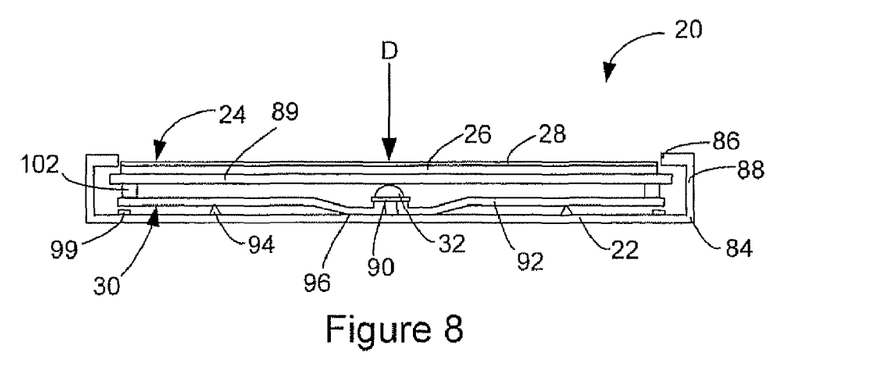
FIG. 8 is a simplified sectional side view of the portable electronic device of FIG. 6 (not to scale), showing a force applied to another point on the touch screen display.

Reference is now made to FIGS. 6, 7 and 8 to describe a portable electronic device 20 according to another embodiment. Many of the features of the present embodiment are similar to those described above and are therefore not further described herein. The feedback mechanism 30 of the present embodiment differs from the feedback mechanism described above, however. Again, the portable electronic device 20 includes the feedback mechanism 30 which, in the present embodiment, includes the switch 32 as well as other components for providing tactile feedback to the user of the portable electronic device 20 when applying a force by user-pressing on the input surface 28 of the touch screen display 24. According to the present embodiment, the switch 32 is a mechanical dome-type switch 32 and is shown in FIG. 6 in the uncompressed or non-actuated state. The switch 32 is not limited to a dome-type switch and can be any suitable mechanical switch. The switch 32 is disposed on a switch platform 90 that is moveable away from the base 22, in the direction of the touch screen display 24. Thus, the switch 32 is also moveable, with the switch platform 90, toward the touch screen display 24. Each of four lever arms 92 extend from a side of the switch platform 90 that is opposite to the side on which the switch 32 is disposed, toward respective corners of the touch screen display 24. Each of the lever arms 92 is pivotable about a respective fulcrum provided by a respective pivot 94 having a triangular cross-section and disposed between the base 22 and the respective lever arm 92, as shown in FIG. 6. It will be appreciated that the lever arm 92 can also pivot about a pivot pin, rather than the triangular cross-sectional pivot 94. The lever arms 92 are each shaped to provide a rest surface 96 proximal the switch platform 90 for resting against the base 22 when no force is applied to the touch screen display 24. In the present embodiment, no projection is provided as in the first-described embodiment. Instead, a respective biasing element 102 in the form of a foam biasing element is disposed between each lever arm 92 and the display support 89 of the touch screen display 24 and is in contact with both the respective lever arm 92 and the display support 89 when the touch screen display 24 is in the rest position, absent an applied force to the input surface 28. Although the biasing element is described as being a foam biasing element, any suitable biasing element can be used.

As shown, the pivot 94 is located between the rest surface 96 and the biasing element 102 for pivoting between the rest position, as shown in FIG. 6 and a pivoted position, as best shown by the lever arm 92 at the left-hand side of FIG. 7. Again, stops 99 are provided between the base 22 and the lever arms 92 for limiting displacement of the lever arms 92 and the touch screen display 24 toward the base 22. The stops 99 are not limited to the stops shown in the figures and can take any suitable form. In the present embodiment, the biasing elements are connected to the respective lever arm 92 for biasing the touch screen display 24 toward the frame 86.

It will again be appreciated that each lever arm 92 is pivotable about the fulcrum provided by the respective pivot 94 to cause movement of the switch platform 90 and the switch 32 between the base 22 and the touch screen display 24. Thus, displacement of the touch screen display 24 by a force applied by a user pressing on the touch screen display, causes the touch screen display 24 to compress the biasing elements 102. Application of a force near a corner of the touch screen display 24 by a user pressing on the touch-sensitive input surface 28, proximal one of the corners, causes pivoting of the touch screen display 24 such that the corner to which the force is applied, moves toward the base 22 and compresses the respective biasing element 102, pivoting the respective lever arm 92 until the respective lever arm 92 abuts the respective stop 92. Pivoting of the lever arm 92 results in displacement of the switch platform 90 and the switch 32 away from the base, toward the touch screen display 24 to actuate the switch 32 as a result of compression against the display support 89. Application of a force near a center of the touch screen display 24 by a user pressing on the touch-sensitive input surface 28, proximal a center thereof, causes displacement of the touch screen display 24 and compression of all the biasing elements 102. According to the present embodiment, when the force is applied directly to the center of the touch screen display 24, the touch screen display 24 is displaced resulting in actuation of the switch 32.

Continued reference is made to FIGS. 7 and 8 to describe movement of the touch screen display 24 within the housing 84 of the portable electronic device 20. Referring first to FIG. 7, there is shown a simplified sectional side view of the portable electronic device 20 according to an exemplary embodiment in which a force is applied by, for example, a user pressing a finger on the touch-sensitive input surface 28 of the touch screen display 24, in the direction of the arrow "C". As shown, the user presses on the touch screen display 24 proximal one side of the portable electronic device 20, resulting in pivoting of the touch screen display 24 such that the touch screen display 24 pivots against the underside of the frame 86, along an edge on the opposite side of the portable electronic device 20. In the example of FIG. 7, touch screen display 24 pivots, causing pivoting of the lever arms 92B, into abutment with the stops 99B. With the pivoting of the lever arms 92B on the left-hand side of the portable electronic device 20, the switch platform 90 and the switch 32 are displaced by the lever arms 92B, toward the display support 89, causing actuation of the switch 32.

Referring now to the example of FIG. 8 in which a force is applied by, for example, a user pressing a finger on the touch-sensitive input surface 28, approximately at the center of the touch screen display 24, in the direction of the arrow "D". As shown, the user presses on the touch screen display 24, resulting in displacement of the touch screen display 24 toward the base 22 such that all the biasing elements 102 are compressed. It will be appreciated from the Figure that the touch screen display 24 is displaced toward the base 22 while maintaining generally parallel alignment with the base 22. The displacement of the touch screen display 24 causes compression of all of the biasing elements 92 and actuation of the switch 32. In the present example, the touch screen display 24 causes compression of the biasing elements 102 and, after actuation of the switch, flexing of the lever arms 92 into contact with the stops 99. Thus, the touch screen display 24 is displaced about the same distance at the center when a force is applied to the centre as at the sides when a force is applied near a side of touch screen display 24.

In FIG. 6, no force is applied to the input surface 28 of the touch screen display 24 and therefore the touch screen display 24 is in the rest position in which it is biased towards the frame 86. A relative displacement of the touch screen display 24 and the switch 32 of a distance "d" toward each other, results in actuation of the switch 32. In the present embodiment, the touch screen display 24 is already in contact the biasing elements 102. Referring now to FIG. 8, the force "D" applied to the center of the touch screen display results in displacement of the touch screen display 24 a distance of "d" at each corner and a similar distance of "d" at the center as the biasing elements 102 are compressed. Alternatively, the biasing elements 102 are compressed and the lever arms 92 are flexed. Thus, the touch screen display 24 is further displaced after actuation of the switch 32 to a total displacement of "d". In FIG. 7, however, the force "C" is applied to the touch screen display 24, on one side thereof. Thus, the touch screen display 24 pivots against the underside of the frame 86 on the side opposite to the side at which the force is applied, as described above. In the view shown in FIG. 7, the left side of the touch screen display 24 to which the force is applied is displaced a distance of "d" to cause the lever arms 92B to pivot, displacing the switch 32 away from the base 22 and toward the touch screen display 24. Thus, the center of the touch screen display 24 is displaced approximately ½"d" and the switch 32 is displaced approximately ½"d". The total relative movement of the switch 32 toward the center of the touch screen display and the center of the touch screen display 24 toward the switch 32 is "d" to actuate the switch 32. It will again be appreciated that the position of the pivots 94 can be determined for best performance and the pivots 94 are not required to be centrally located along the respective lever arms 92.

Figure 9:
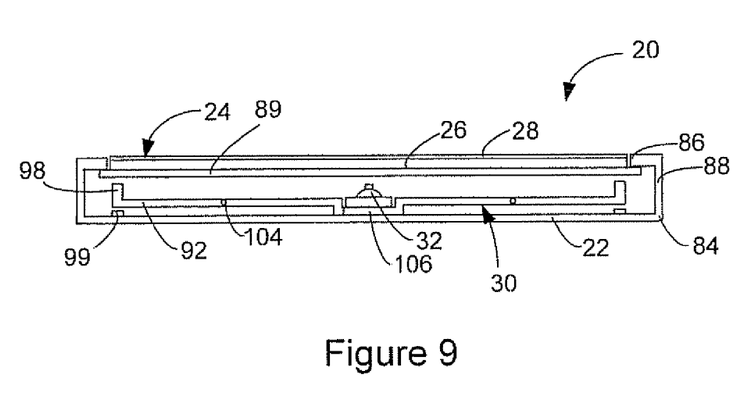
FIG. 9 is a simplified sectional side view of the portable electronic device according to yet another embodiment (not to scale)
Figure 10:
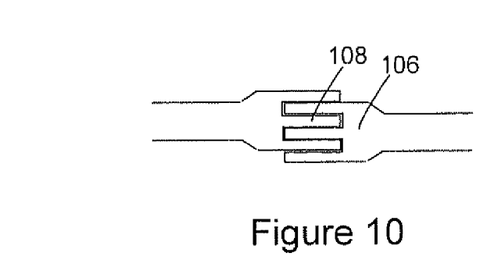
FIG. 10 is a top view of a portion of the portable electronic device of FIG. 9.
Figure 11:
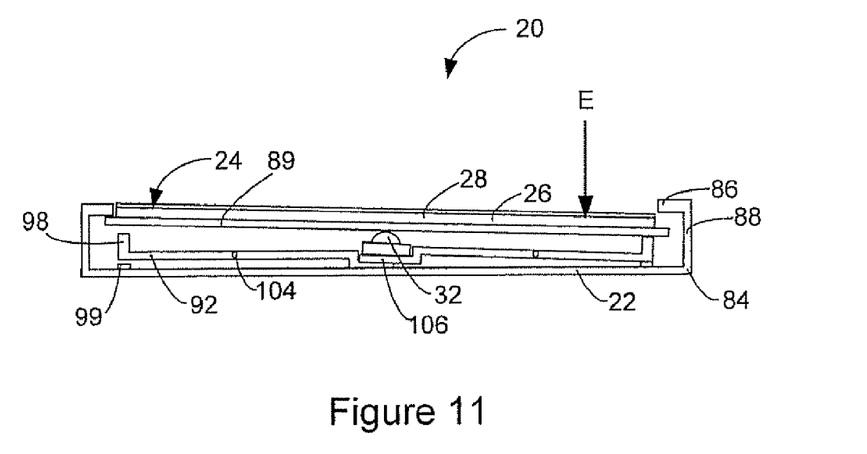
FIG. 11 is a simplified sectional side view of the portable electronic device according to the embodiment shown in FIG. 9 (not to scale), showing a force applied to a point on the touch screen display.

Reference is now made to FIGS. 9 to 11 to describe an electronic device according to yet another embodiment. Many of the features of the present embodiment are similar to those in the previously described embodiments and are therefore not further described herein. The feedback mechanism 30 of the present embodiment differs from the feedback mechanism described above, however. Again, the portable electronic device 20 includes the feedback mechanism 30 which, in the present embodiment, includes the switch 32 as well as other components for providing tactile feedback to the user of the portable electronic device 20 when applying a force by user-pressing on the input surface 28 of the touch screen display 24. The switch 32 can be, for example, a mechanical dome-type switch 32 and is shown in FIG. 9 in the uncompressed or non-actuated state. The switch 32 is moveable away from the base 22, in the direction of the touch screen display 24. In the present exemplary embodiment, two lever arms 92 extend from an underside of the switch 32, where they are located between the switch 32 and the base 22, toward respective sides of the touch screen display 24. Each of the lever arms 92 is pivotable about a respective pivot pin 104 located between ends of the lever arm 92, as shown in FIG. 9. The location of the pivot pin 104 can be selected to provide suitable operation of the feedback mechanism 30. The lever arms 92 are each shaped to provide a respective support surface 106 on an end thereof on which the switch 32 is located. The respective support surfaces 106 rest against the base 22 when no force is applied to the touch screen display 24. Referring to FIG. 10, a top view of the support surfaces 106 is shown. Each support surface 106 includes fingers 108 that are interlaced between the fingers 108 of the other support surface 106 to support the switch 32 for displacement of the switch 32. In the present embodiment, each lever arm 92 is shaped to provide a projection 98 on the end, opposite the end with the support surface. The projection is spaced from the touch screen display 24 when the touch screen display is in the rest position, absent an applied force to the input surface 28. Again, stops 99 extend from the base near respective ends of the lever arms 92 for limiting displacement of the lever arms 92 and the touch screen display 24.

It will be appreciated that each lever arm 92 is pivotable about the respective pivot pin 104 to cause movement of the switch 32 between the base 22 and the touch screen display 24. Thus, displacement of the touch screen display 24 by a force applied by a user pressing on the touch screen display, causes the touch screen display 24 to contact at least one of the two projections 98. Application of a force on one side of the touch screen display 24 by a user pressing on the touch-sensitive input surface 28, causes pivoting of the touch screen display 24 such that the side to which the force is applied, moves toward the base 22 and contacts the respective projection 98, causing pivoting of the respective lever arm 92. Pivoting of the lever arm 92 results in displacement of the respective support surface 106 and thus, displacement of the switch 32 away from the base 22, toward the touch screen display 24 to actuate the switch 32 as a result of compression against the display support 89. Application of a force near a center of the touch screen display 24 by a user pressing on the touch-sensitive input surface 28, proximal a center thereof, causes displacement of the touch screen display 24 into contact with the projections 98 resulting in actuation of the switch 32.

Continued reference is made to FIG. 11 to describe movement of the touch screen display 24 within the housing 84 of the portable electronic device 20. FIG. 11 shows a simplified sectional side view of the portable electronic device 20 according to an exemplary embodiment in which a force is applied by, for example, a user pressing a finger on the touch-sensitive input surface 28 of the touch screen display 24, in the direction of the arrow "E". As shown, the user presses on the touch screen display 24 proximal one side of the portable electronic device 20, resulting in pivoting of the touch screen display 24 such that the display support 89 contacts the projection 98 on the end of the lever arm 92 at the same side of the touch screen display 24 to which the force is applied. It will be appreciated from the Figure that when a force is applied on the touch screen display 24, the touch screen display 24 pivots against the underside of the frame 86, along an edge on the opposite side of the portable electronic device 20. In the example of FIG. 11, the touch screen display 24 contacts the projection 98 on the right-hand side as a result of the force "E" being applied on the right-hand side of the touch screen display 24, causing pivoting of the respective lever arm 92. With the pivoting of the lever arm 92 on the right-hand side of the portable electronic device 20, the switch 32 is displaced by the support surface 106 of the respective lever arm 92, away from the base 22, toward the display support 89, causing actuation of the switch 32.

When a force is applied near the center of the touch screen display 24 of the present embodiment, the touch screen display 24 is displaced into contact with the projections 98 and causes flexing of the lever arms 92 after actuation of the switch 92 such that both lever arms 92 abut the stops 99.

In FIG. 9, no force is applied to the input surface 28 of the touch screen display 24 and therefore the touch screen display 24 is in the rest position in which it is biased towards the frame 86 by biasing elements (not shown). A relative displacement of the touch screen display 24 and the switch 32 of a distance "d" toward each other, results in actuation of the switch 32. In the present embodiment, the touch screen display 24 contacts the projections 98 prior to actuation of the switch 32. Further displacement of the touch screen display 24 toward the base 22 causes pivoting of the lever arm (or arms 92). When a force is applied to the center of the touch screen display, the touch screen display 24 is displaced a distance of "d" at each side and a similar distance of "d" at the center as the touch screen display 24 contacts the projections 98 and flexes the lever arms 92. Thus, the touch screen display 24 is further displaced after actuation of the switch 32 to a total displacement of "d". In FIG. 11, however, the force "E" is applied to the touch screen display 24, on one side thereof. Thus, the touch screen display 24 pivots against the underside of the frame 86 on the side opposite to the side at which the force is applied, as described above. In the view shown in FIG. 11, the right side of the touch screen display 24 to which the force is applied is displaced a distance of "d" to cause the lever arm 92 on the right side to pivot, displacing the switch 32 away from the base 22 and toward the touch screen display 24. Thus, the center of the touch screen display 24 is displaced approximately ½"d" and the switch 32 is displaced approximately ½ "d". The total relative movement of the switch 32 toward the center of the touch screen display and the center of the touch screen display 24 toward the switch 32 is "d" to actuate the switch 32. It will again be appreciated that the position of the pivots 94 can be determined for best performance and the pivots 94 are not required to be centrally located along the respective lever arms 92.

Figure 12:
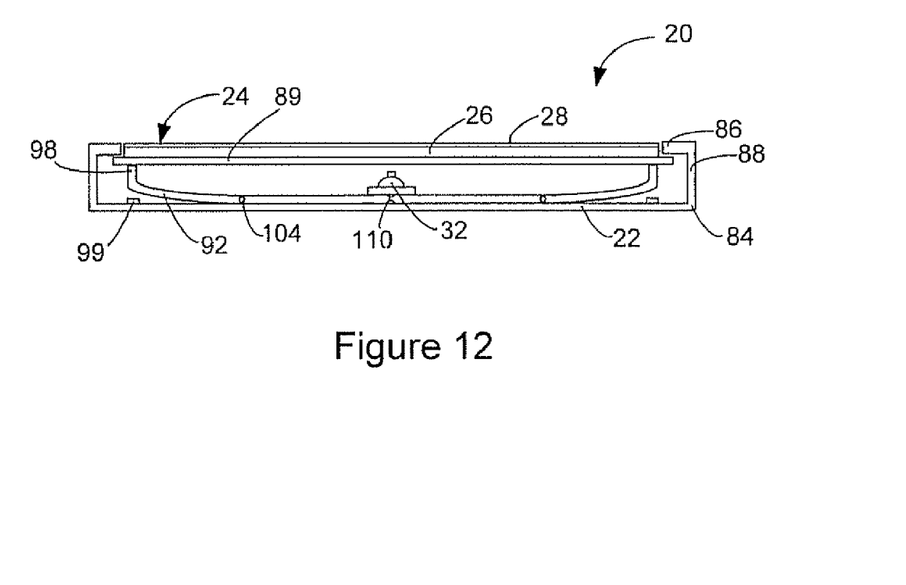
FIG. 12 is a simplified sectional side view of a portable electronic device according to still another embodiment (not to scale)
Figure 13:
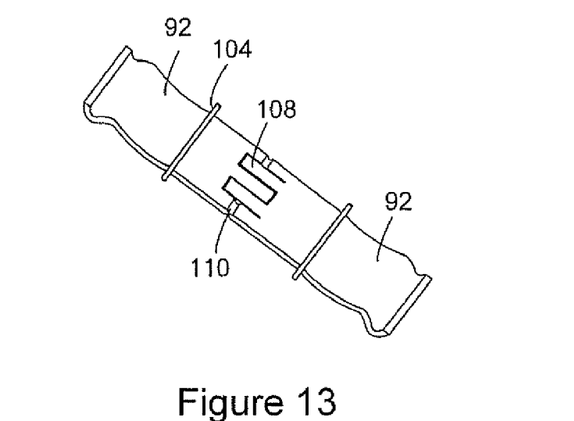
FIG. 13 is a perspective view of a portion of the portable electronic device of FIG. 10.

Reference is now made to FIGS. 12 and 13 to describe an electronic device according to yet another embodiment. Many of the features of the present embodiment are similar to those in the previously described embodiments and are therefore not further described herein. The feedback mechanism 30 of the present embodiment differs from the feedback mechanism described above, however. Again, the portable electronic device 20 includes the feedback mechanism 30 which, in the present embodiment, includes the switch 32 as well as other components for providing tactile feedback to the user of the portable electronic device 20 when applying a force by user-pressing on the input surface 28 of the touch screen display 24. The switch 32 can be, for example, a mechanical dome-type switch 32 and is shown in FIG. 12 in the uncompressed or non-actuated state. The switch 32 is moveable away from the base 22, in the direction of the touch screen display 24. In the present exemplary embodiment, two lever arms 92 extend from an underside of the switch, toward respective sides of the touch screen display 24. Each of the lever arms 92 is pivotable about a respective pivot pin 104 located between ends of the lever arm 92, as shown in FIG. 12. It will again be appreciated that the location of the pivot pin 104 can be selected for suitable operation and performance of the feedback mechanism 30. The lever arms 92 are connected to each other at respective ends thereof and are unitary, with a thinned, flexible portion of material between the two lever arms 92 to provide a hinge 110. The lever arms 92 are fingers 108 that are interlaced to support the switch 32 for displacement.

Referring to FIG. 13, a perspective view of portions of the feedback mechanism 30 including the lever arms 92, the pivot pins 104 and the finger 108 are shown. In the example shown in FIG. 13, one of the lever arms 92 includes a single finger 108 located between two fingers 108 of the other of the lever arms 92. It will be appreciated that the lever arms 92 and fingers 108 are constructed of a suitable plastic material for repeated relative motion provided by the hinge 110. Each lever arm 92 is also shaped to provide a projection 98 on the end, opposite the end that includes the fingers 108. The projection 98 is spaced from the touch screen display 24 when the touch screen display is in the rest position in which it is biased toward the frame 86 by a biasing element or biasing elements (not shown).

It will be appreciated that each lever arm 92 is pivotable about the respective pivot pin 104 to cause movement of the finger 108 which support the switch 32, therefore causing movement of the switch 32 between the base 22 and the touch screen display 24. Thus, displacement of the touch screen display 24 by a force applied by a user pressing on the touch screen display, causes the touch screen display 24 to contact at least one of the two projections 98. Application of a force on one side of the touch screen display 24 by a user pressing on the touch-sensitive input surface 28, causes pivoting of the touch screen display 24 such that the side to which the force is applied, moves toward the base 22 and contacts the respective projection 98, causing pivoting of the respective lever arm 92 into contact with the respective stop 99. Pivoting of the lever arm 92 results in displacement of the fingers 108 and thus, displacement of the switch 32 away from the base 22, toward the touch screen display 24 to actuate the switch 32 as a result of compression against the display support 89. Application of a force near a center of the touch screen display 24 by a user pressing on the touch-sensitive input surface 28, proximal a center thereof, causes displacement of the touch screen display 24, into contact with the projections 98 and further displacement resulting in actuation of the switch 32. As in the embodiment described with reference to FIGS. 9 to 11, the lever arms 92 in the present embodiment flex when a force is applied to center of the touch screen display 24, such that the lever arms 92 contact the respective stops 99.

The touch screen display 24 and the feedback mechanism 30 including the mechanical switch 32 that is moveable with respect to the base 22 provides the user with a desirable tactile feedback. The feedback mechanism 30 provides for relative movement of the switch 32 in relation to the touch screen display 24, reducing the displacement required to actuate the switch 32 when a force is applied proximal a side or corner on the touch screen display 24. The feedback mechanism 30 therefore compensates for the difference in displacement of the center of the touch screen display 24 when a force is applied near a side or corner thereof, versus the displacement of the of the center of the touch screen display 24 when a force is applied near the center thereof. Thus, the touch screen display 24 is moved towards the switch 32 and the switch 32 can be moved towards the touch screen display 24. Absent such a compensation mechanism, the displacement of the touch screen display 24 when a force is applied proximal an edge thereof, is about twice the displacement of the touch screen display 24 when a force is applied proximal the center.

According to one aspect, an electronic device includes a base and a touch screen display connected to the base and movable relative thereto. The touch screen display includes a display device and a touch-sensitive input surface overlying the display device. The electronic device includes a feedback mechanism including a switch moveable relative to the base for actuating in response to application of a force to the touch-sensitive input surface causing movement of the touch screen display. Operational components are connected to the touch screen display for operation of the electronic device.

According to another aspect, the touch screen display includes a display support for providing mechanical support to the display device and touch-sensitive input surface with the display device and the touch-sensitive input surface disposed on the display support.

According to another aspect, the feedback mechanism includes at least one lever for moving the switch in response to movement of the touch screen display resulting from the force applied to the touch-sensitive input surface.

According to another aspect, the feedback mechanism can include a pair of lever arms extending from proximal the switch toward opposing sides of the touch screen display for moving the switch in response to movement of the touch screen display.

According to yet another aspect, the feedback mechanism can include four lever arms, each lever arm extending from the switch toward a respective corner of the touch screen display for moving the switch in response to movement of the touch screen display.

According to embodiments, the lever arms can be pivotable about, for example, respective pivot pins in response to movement of the touch screen display towards the base, and can extend under an underside of the switch for moving the switch toward the touch screen display when pivoting. The lever arms can be spaced from the touch screen display when absent an applied force on the touch-sensitive input surface. A biasing element can be disposed between each lever arm and the touch screen display. The feedback mechanism can include a platform on which the switch is disposed. The lever arms can be hinged together and can be unitary with the hinge formed of thin material. Each of the lever arms can include lifting figures disposed between the base and the switch, the lifting fingers of one of the lever arms interposed between the lifting fingers of the other of the lever arms. The switch is generally centered with respect to the base and can be a dome type switch.

According to another aspect, there is provided a touch screen display that includes a base, a display device connected to the base and movable relative thereto, a touch-sensitive input surface overlying the display device, and a feedback mechanism. The feedback mechanism includes a switch moveable relative to the base for actuating in response to application of a force to the touch-sensitive input surface causing movement of the touch-sensitive input surface and the display device.

While the embodiments described herein are directed to particular implementations of the portable electronic device, it will be understood that modifications and variations to these embodiments are within the scope and sphere of the present application. For example, the size and shape of many of the features of the portable electronic device can differ while still providing the same function. Many other modifications and variations may occur to those skilled in the art. All such modifications and variations are believed to be within the sphere and scope of the present application.

What is claimed is:
1. An electronic device comprising:
a base;

a touch screen display coupled to the base and movable relative to the base, the touch screen display including a display and a touch-sensitive overlay;

a feedback mechanism comprising a switch that, when a force is applied to the touch-sensitive overlay that causes pivotal movement of the touch screen display relative to the base, is moved away from the base toward the touch-sensitive overlay and is actuated.

2. The electronic device according to claim 1, wherein the touch screen display comprises a display support for providing support to the display and the touch-sensitive overlay, wherein the display and the touch-sensitive overlay are disposed on the display support.

3. The electronic device according to claim 2, wherein the feedback mechanism comprises at least one lever for moving the switch in response to movement of the touch screen display.

4. The electronic device according to claim 2, wherein the feedback mechanism comprises a pair of lever arms extending from near the switch toward opposing sides of the touch screen display for moving the switch in response to movement of the touch screen display.

5. The electronic device according to claim 4, wherein each lever arm is pivotable with respect to the base.

6. The electronic device according to claim 5, wherein each lever arm is pivotable about a pivot pin.

7. The electronic device according to claim 5, wherein each lever arm is spaced from the touch screen display when absent an applied force on the touch-sensitive overlay.

8. The electronic device according to claim 7, comprising a respective biasing element disposed between each lever arm and the touch screen display.

9. The electronic device according to claim 5, wherein each lever arm is pivotable in response to movement of the touch screen display towards the base.

10. The electronic device according to claim 9, wherein each lever arm extends under the switch, between the base and the switch, for moving the switch toward the touch screen display when pivoting.

11. The electronic device according to claim 10, wherein the switch is movable toward the touch screen display by each lever arm.

12. The electronic device according to claim 5, wherein each lever arm comprises a support surface for supporting the switch when the switch is displaced.

13. The electronic device according to claim 12, wherein a pair of lever arms are hinged together.

14. The electronic device according to claim 13, wherein the pair of lever arms are connected together by a thin portion of material.

15. The electronic device according to claim 5, wherein a pair of lever arms are hinged together under the switch.

16. The electronic device according to claim 5, wherein each of the pair of lever arms includes lifting fingers disposed between the base and the switch, wherein the lifting fingers of one of the lever arms are interposed between the lifting fingers of the other of the lever arms.

17. The electronic device according to claim 2, wherein the feedback mechanism comprises four lever arms, each lever arm extending from the switch toward a respective corner of the touch screen display for moving the switch in response to movement of the touch screen display.

18. The electronic device according to claim 1, wherein the switch is substantially centered in relation to the base.

19. The electronic device according to claim 18, wherein the switch is a dome-type switch.

20. The electronic device according to claim 1, comprising sidewalls and a frame framing the touch screen display and connected to the base by the sidewalls.

21. The electronic device according to claim 1, comprising flexible sidewalls extending between the base and the touch screen display.

22. The electronic device according to claim 21, wherein the flexible sidewalls are continuous and extend around the periphery of the touch screen display.

23. An apparatus comprising:
a base;
a display coupled to and movable relative to the base;
a touch-sensitive overlay;
a feedback mechanism comprising a switch that, when a force is applied to the touch-sensitive overlay that causes pivotal movement of the display relative to the base, is moved away from the base toward the touch-sensitive overlay and is actuated.

* * * * *